(12) United States Patent
Trunk et al.

(10) Patent No.: US 9,231,482 B2
(45) Date of Patent: Jan. 5, 2016

(54) APPARATUS FOR REGULATING AN ENERGY SYSTEM AND METHOD FOR OPERATING AN ENERGY SYSTEM

(71) Applicant: Robert Bosch GmbH, Stuttgart (DE)

(72) Inventors: Martin Trunk, Moeglingen (DE); Rene Schenk, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 14/161,231

(22) Filed: Jan. 22, 2014

(65) Prior Publication Data

US 2014/0204621 A1    Jul. 24, 2014

(30) Foreign Application Priority Data

Jan. 22, 2013    (DE) .......................... 10 2013 200 937

(51) Int. Cl.
| | |
|---|---|
| *H02M 1/00* | (2007.01) |
| *H02M 3/335* | (2006.01) |
| *H02M 1/44* | (2007.01) |

(52) U.S. Cl.
CPC ............ *H02M 3/33507* (2013.01); *H02M 1/44* (2013.01); *H02M 2001/0022* (2013.01)

(58) Field of Classification Search
CPC ................. H02M 2001/0022; H02M 3/33507; H02M 1/44
USPC .......................... 363/21.01, 21.04, 74, 78, 299
See application file for complete search history.

(56) References Cited

U.S. PATENT DOCUMENTS

| | | | |
|---|---|---|---|
| 5,442,534 A * | 8/1995 | Cuk et al. ........................ 363/16 |
| 2008/0284387 A1 | 11/2008 | Chen et al. |
| 2010/0080023 A1 * | 4/2010 | Jain ................................ 363/65 |
| 2010/0321096 A1 * | 12/2010 | Sudjian ......................... 327/530 |
| 2011/0109159 A1 * | 5/2011 | Davis et al. ..................... 307/52 |
| 2012/0121106 A1 * | 5/2012 | Henriksen .................... 381/94.1 |
| 2012/0286717 A1 * | 11/2012 | Fukuta et al. ................. 318/722 |
| 2013/0063108 A1 * | 3/2013 | Nishida et al. ................ 323/271 |

* cited by examiner

*Primary Examiner* — Timothy J Dole
*Assistant Examiner* — Sisay G Tiku
(74) *Attorney, Agent, or Firm* — Michael Best & Friedrich LLP

(57) ABSTRACT

The present invention provides compensation of rapid fluctuations in voltage in a DC-to-DC converter. For this, the primary side of the DC-to-DC converter is monitored by means of capacitive voltage dividers. A voltage fluctuation occurring in the process can be identified early and thereupon the DC-to-DC converter can be controlled correspondingly to counteract this.

9 Claims, 3 Drawing Sheets

APPARATUS FOR REGULATING AN ENERGY SYSTEM AND METHOD FOR OPERATING AN ENERGY SYSTEM

BACKGROUND OF THE INVENTION

The present invention relates to an apparatus for regulating an energy system which is connected to a DC voltage, and to a method for operating such an energy system which is connected to a DC voltage.

It is known to operate electrical appliances by means of a DC voltage. In this case, the DC voltage provided is not always available to the voltage level required for the operation of an appliance. In this case, the DC voltage first needs to be matched by a suitable DC-to-DC converter. Such DC-to-DC converters are furthermore in special embodiments also capable of enabling galvanic isolation between the primary side at the input of the DC-to-DC converter and the secondary side at the output of the converter. For such isolated DC voltage conversion, the primary voltage on the input side is first converted via electronic switching elements into an AC voltage. Thereupon, the electrical energy can be transformed via a transformer. On the secondary side of the transformer, the transformed AC voltage can in turn be rectified and filtered, if required. An isolated DC-to-DC converter is known, for example, from the document DE 10 2008 022 910 A1. Said document discloses a method for operating a DC-to-DC converter over a large load range.

FIG. 1 shows a schematic illustration of an isolated DC-to-DC converter. A primary DC voltage is in this case first converted in an inverter 4 into an AC voltage. This AC voltage is supplied to the primary terminal of a transformer 1. The resulting output voltage at the secondary terminal of the transformer 1 is then rectified in a rectifier 5 and smoothed, if necessary. In the process, drive electronics 6 monitor the output voltage and, if required, adapt the driving of the inverter in such a way that an output voltage which is as constant as possible is achieved. If in the process the driving of the switches on the primary side of the DC-to-DC converter likewise takes place via suitable drive transformers 2 and 3, no voltage supplies for driving the DC-to-DC converter are required on the primary side.

If, however, relatively large voltage fluctuations occur on the primary side of the DC-to-DC converter, the output voltage is difficult to adjust stably when the voltage fluctuation on the primary side is not known. Therefore, for the regulation of a DC-to-DC converter, it is desirable to be able to sense the primary voltage and to incorporate the variation in the primary voltage in the regulation procedure.

In order to maintain the isolation between the primary side and the secondary side of the DC-to-DC converter, a voltage measurement on the primary side is very involved. For example, the voltage on the primary side can first be measured. For galvanic isolation, the measured value can then be transmitted in analog form by means of optical or magnetic coupling to the regulation system 6 located on the secondary side. For this, however, an additional supply voltage is required on the primary side.

Furthermore, it is also possible to convert the voltage on the primary side after the measurement directly into a digital signal and then to transmit this digital signal to the secondary side, for example via magnetic or capacitive coupling. However, this solution is very involved and results in relatively low dynamics owing to the analog-to-digital conversion.

A further alternative comprises a measurement of the primary-side voltage by means of a differential amplifier with a high resistance over the isolation barrier. This differential amplifier needs to have an extremely high resistance, however. Furthermore, with this solution unavoidable leakage resistances are to be expected.

There is therefore a requirement for an improved apparatus for regulating an energy system, such as an isolated DC-to-DC converter, for example, in which voltage fluctuations on the primary side can be detected and compensated for in a simple manner.

SUMMARY OF THE INVENTION

In accordance with a first aspect, the present invention provides an apparatus for regulating an energy system which is connected to a DC voltage, comprising a first capacitive voltage divider, which is arranged between a first terminal of the DC voltage and a reference potential; a second capacitive voltage divider, which is arranged between a second terminal for the DC voltage and the reference potential; a voltage detector, which is designed to detect a voltage difference between a central terminal of the first voltage divider and a central terminal of the second voltage divider; and a compensation apparatus, which is designed to control the energy system connected to the DC voltage depending on the detected voltage difference.

In accordance with a further aspect, the present invention provides a method for operating an energy system which is connected to a DC voltage, comprising the steps of providing a first capacitive voltage divider, which is arranged between a first terminal of the DC voltage and a reference potential; providing a second capacitive voltage divider, which is arranged between a second terminal of the DC voltage and the reference potential; monitoring a voltage difference between a central terminal of the first voltage divider and a central terminal of the second voltage divider; and controlling the energy system depending on the monitored voltage difference.

One concept of the present invention consists in coupling out and then detecting voltage fluctuations in a DC voltage signal by means of capacitive dividers. While the capacitive dividers are insensitive to DC voltage components, AC voltage components as are caused, inter alia, by rapid voltage fluctuations can be sensed by capacitive voltage dividers. In particular very rapid high-frequency fluctuations are sensed well by capacitive voltage dividers and are therefore available for further-processing, for example for rapid compensation of the voltage fluctuations occurring in a DC-to-DC converter.

Particularly advantageous here is the fact that, in order to suppress interference signals and in order to improve the electromagnetic response, the DC voltage terminals of the energy system are normally in any case connected to capacitors with corresponding dielectric strength. Since these capacitors with dielectric strength are therefore provided in any case in the circuit design, the capacitive voltage dividers according to the invention can be realized by connecting these capacitors in series with further, relatively inexpensive capacitors. The capacitive dividers according to the invention can thus be integrated in the circuit design in an inexpensive manner. Therefore, information on the primary-side changes in voltage can be provided for secondary-side regulation. Regulation can then already respond early to voltage fluctuations and control the energy system correspondingly to counteract these fluctuations.

In accordance with one embodiment in the present invention, the first capacitive divider comprises a first capacitance and a second capacitance, which are connected in series, wherein a first terminal of the first capacitance is connected to the first terminal of the DC voltage, a second terminal of the first capacitance is connected to a first terminal of the second capacitance in order to form the central terminal of the first voltage divider, and a second terminal of the second capacitance is connected to the reference potential; the second capacitive divider comprises a third capacitance and a fourth capacitance, which are connected in series, wherein a first terminal of the third capacitance is connected to the second terminal of the DC voltage, a second terminal of the third capacitance is connected to a first terminal of the fourth capacitance in order to form the central terminal of the second voltage divider, and a second terminal of the fourth capacitance is connected to the reference potential. Given such an arrangement of the capacitive dividers, the capacitances which are already required in any case for interference suppression of the electromagnetic interference signals can be used as first and third capacitances, and therefore only relatively inexpensive capacitors are required for the second and fourth capacitance to construct the voltage divider.

In accordance with a further embodiment, the second capacitance comprises at least two capacitors, and the fourth capacitance comprises at least two capacitors. By virtue of the second and fourth capacitances each being constructed by at least two capacitors, it is possible to use at least one capacitor with a relatively low capacitance which is particularly suitable for filtering out high-frequency interference signals, while the respective other capacitor can have a relatively high capacitance in order thus to adjust the desired divider ratio for the capacitive dividers such that a large proportion of the voltage is present as a voltage drop across the capacitors, with particularly good dielectric strength, of the first and third capacitances.

In accordance with one embodiment, the apparatus also comprises a first resistor, which is arranged in parallel with the second capacitance, and a second resistor which is arranged in parallel with the fourth capacitance. By virtue of the resistors being connected in parallel with the second and fourth capacitances of the capacitive voltage divider in this way, it is possible to reliably prevent an undesired DC voltage from building up across one of the capacitances as a result of leakage currents which may be present in the capacitors over time.

In accordance with a further embodiment, the apparatus further comprises a first voltage limiter which is designed to limit the voltage between the central terminal of the first voltage divider and the reference potential, and a second voltage limiter, which is designed to limit the voltage between the central terminal of the second voltage divider and the reference potential. Preferably, such voltage limiters can be realized by two diodes being connected back-to-back in parallel. By using such voltage limiters, it is possible to reliably prevent a downstream evaluation apparatus from being damaged by the high voltage pulses in the event of particularly high voltage fluctuations occurring.

In accordance with a further embodiment, the apparatus further comprises a filter apparatus, which is designed to suppress interference signals from the detected voltage difference. Preferably, the filter apparatus is a low-pass filter. By suppressing interference signals, preferably high-frequency interference pulses, as occur, for example, owing to the switching operations during the generation of the AC voltage, it is thus possible to distinguish reliably between actual voltage fluctuations within the DC voltage and interference owing to switching operations.

In a preferred embodiment, the energy system is a DC-to-DC converter, preferably an isolated DC-to-DC converter. Precisely in the case of isolated DC-to-DC converters, efficient regulation for a secondary voltage which is as constant as possible can be achieved by the detection of voltage fluctuations according to the invention.

BRIEF DESCRIPTION OF THE DRAWINGS

Further features and advantages of embodiments of the invention result from the description below with reference to the attached drawings.

DETAILED DESCRIPTION

The illustrations of elements shown in the figures are not necessarily depicted true to scale for reasons of clarity. It goes without saying that the block diagrams shown in the figures and the specific dimensions thereof vary within the scope of consideration by a person skilled in the art and can be matched to the respective application. Identical reference symbols generally denote identical or functionally identical components.

Energy systems within the meaning of the present invention are first all systems which are fed electrical energy. In particular, the energy systems within the meaning of the present invention are those systems which are fed by a DC voltage source. In this case, the energy systems may be an electrical consumer and a system in which electrical energy is converted into another energy form. For example, an energy system may be a system which generates a translatory or rotary movement by means of an electric drive. Alternatively, the electrical energy provided can also be used to feed an optical display, for example, and generate light signals, for example.

Furthermore, energy systems within the meaning of the present invention also include systems in which the electrical energy is converted into electrical energy of another form. Thus, for example, the voltage level of a DC voltage provided can be raised or lowered by an energy system within the meaning of the present invention. In this case, all energy systems on which the present invention is based have the common feature that potential changes in the input voltage provided are intended to be detected and compensated for as quickly as possible for fault-free operation.

The present invention will be described with reference to a DC-to-DC converter below. Furthermore, however, the present invention can likewise be applied to all types of the above-described energy systems. The description with reference to the DC-to-DC converter is intended here not to represent a restriction of the concept according to the invention.

Figure 1:
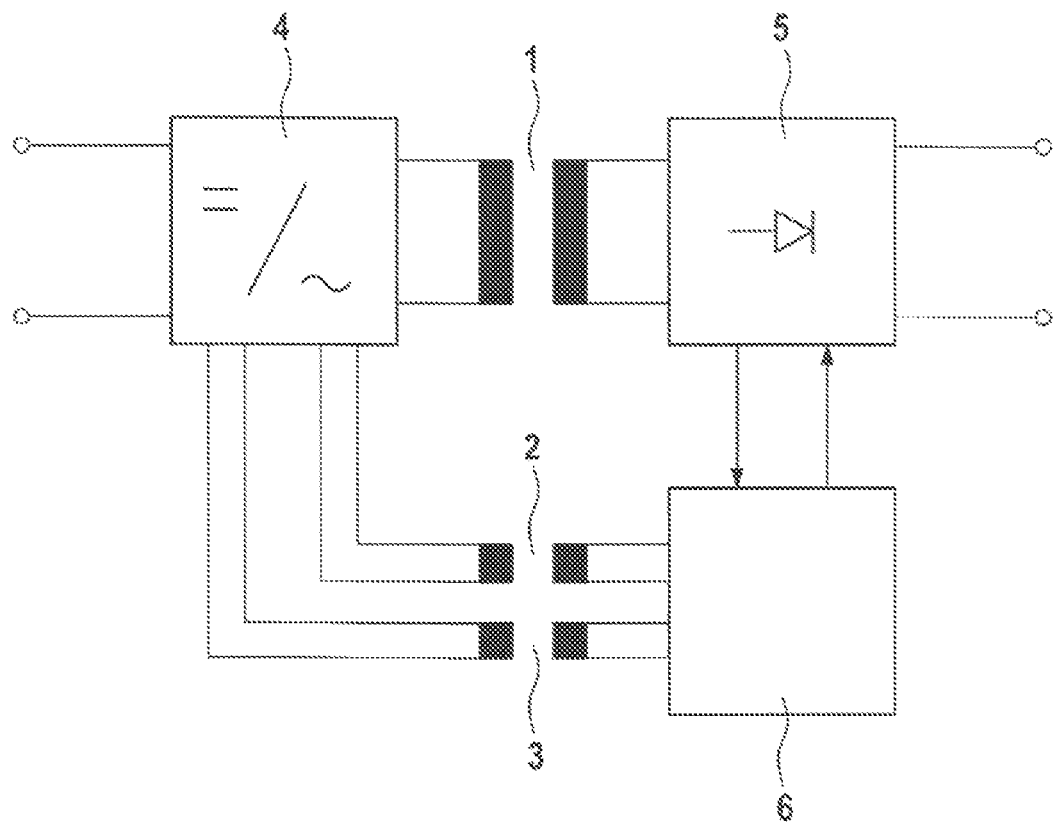
FIG. 1 shows a schematic illustration of a circuit diagram for an isolated DC-to-DC converter.
Figure 2:
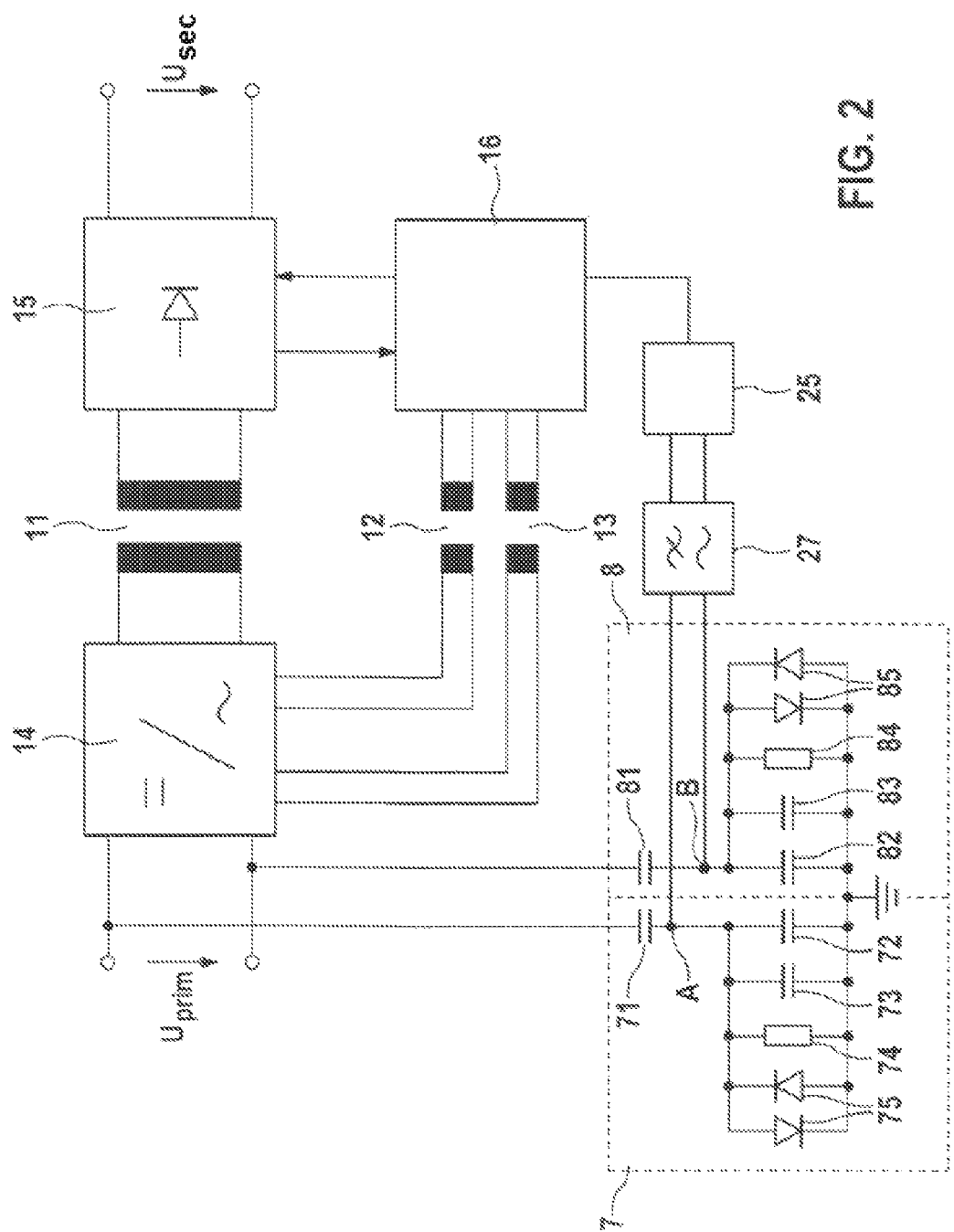
FIG. 2 shows a schematic illustration of a circuit diagram for an isolated DC-to-DC converter in accordance with an embodiment of the present invention.

FIG. 2 shows a schematic illustration of a circuit diagram of an isolated DC-to-DC converter in accordance with one embodiment of the present invention. A primary DC voltage $U_{prim}$ is present at the input of the DC-to-DC converter. This DC voltage $U_{prim}$ is first fed to an inverter 14. The inverter 14 generates an AC voltage by means of internal electronic switches from the applied DC voltage and supplies this AC voltage to the primary side of the transformer 11. The secondary AC voltage of the transformer 11 is then rectified in a rectifier 15 and possibly smoothed. Thus, the secondary DC voltage $U_{sec}$ is present at the output of the DC-to-DC converter. In order to keep the secondary output voltage $U_{sec}$ as constant as possible, this voltage is monitored by drive electronics 16. The drive electronics 16 generate, on the basis of the present measured values, control signals which are firstly sent to the rectifier 15 and furthermore to the inverter 14 via the isolation stages 12 and 13.

Furthermore, the two capacitive voltage dividers 7 and 8 are located at the two inputs of the DC-to-DC converter. The first capacitive voltage divider 7, which is connected to a first terminal for the primary voltage of the DC-to-DC converter, in this case comprises at least a first capacitance 71 and a second capacitance 72. In this case, the first capacitance 71 is connected at a terminal to the voltage supply of the primary voltage and at the other terminal to the central point A of the voltage divider 7. The second capacitance 72 is located between the central point A of the voltage divider 7 and a reference potential, for example the connection to ground of the system. In the same way, the second terminal of the primary voltage is connected to the second capacitive voltage divider 8. This second capacitive voltage divider 8 comprises at least a first capacitance 81 between the second terminal of the primary voltage and the central point B of the second capacitive voltage divider 8. A second capacitance 82 is located between the central point B of the second capacitive voltage divider 8 and the reference potential.

In this case, increased requirements are placed on the two capacitances 71 and 72 which are connected to the live terminals of the primary-side DC voltage, in particular on the dielectric strength, since a large proportion of the voltage is present as voltage drop across these two capacitors. These capacitors generally have a relatively low capacitance in the region of a few nanofarads. Since such capacitors are used even in conventional systems as so-called Y capacitors for interference suppression and for improving the electromagnetic response, these capacitors are generally provided in any case and do not require any additional investment.

Only a very small proportion of the voltage is present as a voltage drop across the further capacitances 72 and 82 of the two voltage dividers 7 and 8, with the result that there are no stringent requirements that need to be placed on these capacitors. Therefore, relatively inexpensive capacitors can be used for these capacitors. Since the voltages along a capacitive voltage divider are distributed inversely proportional to the capacitances used, the capacitances 72 and 82 need to be dimensioned to be correspondingly larger than the capacitances 71 and 81.

In order to achieve a transmission which is as good as possible for high-frequency interference signals, however, very low capacitances are required, on the other hand. Therefore, in each case further capacitances 73 and 83 can be connected in parallel with the relatively large capacitances 72 and 82, which further capacitances have a correspondingly lower capacitance in order to ensure good transmission for high-frequency interference signals. For example, the parallel circuit comprising the capacitances 72 and 73 and the capacitances 82 and 83 can be a parallel circuit comprising a capacitor with 0.1 µF and a capacitor with 1 nF. It is of course also possible for other capacitance values to be selected, depending on the desired division ratio and frequency spectrum of the interference signals.

In order to avoid the build up of a DC voltage potential owing to leakage currents within the capacitors within the voltage dividers 7 and 8, in each case the resistors 74 and 84 are also arranged between the reference potential and the central points A and B of the voltage dividers 7 and 8. These resistors need to be dimensioned such that they have resistances which are as high as possible since they are used exclusively for compensation of the leakage currents in the capacitors.

In addition, the voltage drop between the reference potential and the central points A and B of the voltage dividers 7 and 8 can be limited by suitable measures. For example, arranging two semiconductor diodes 75 and 85 back-to-back in parallel can be used for voltage limitation. In this way, downstream evaluation can be protected from hazardous overvoltages.

For the dimensioning of the capacitances in the voltage dividers, in this case the two Y capacitors 71 and 81 need to be selected to be equivalent to one another, as far as possible. Furthermore, the parallel circuit comprising the two capacitors 72 and 73 between the reference potential and the central point of the first capacitive divider 7 and the parallel circuit comprising the two capacitors 82 and 83 between the reference potential and the central point B of the second capacitive divider 8 should likewise have equivalent capacitance values.

The voltage difference between the two central points A and B of the capacitive dividers is thus proportional to the quotient of $(C_{72}+C_{73})/(C_{71}+C_{72}+C_{73})$, where $C_{71}$ is the capacitance of the first capacitor 71, $C_{72}$ is the capacitance of the capacitor 72, and $C_{73}$ is the capacitance of the capacitor 73. The differential voltage between the two central points A and B of the voltage dividers 7 and 8 is then supplied to a differential amplifier 25, which converts this differential voltage into a voltage-to-ground signal and provides this voltage signal to drive electronics 16. The drive electronics 16 therefore already obtain information very early on a voltage fluctuation on the primary side and can then directly introduce corresponding control commands for compensating for the voltage fluctuation. Thus, compensation of the voltage fluctuation is already possible before the voltage fluctuations have any effects on the secondary voltage of the DC-to-DC converter.

In order to improve the regulation response, furthermore the signal sensed by the differential amplifier 25 can also additionally be filtered in order to eliminate high-frequency interference signals from this voltage difference. For this, a low-pass filter 27 can be arranged upstream of the input of the differential amplifier 25, for example. Alternatively, such a low-pass filter 27 can also be arranged between the differential amplifier 25 and the drive electronics 16 (not illustrated).

Furthermore, it is also possible with such a circuit for sensing voltage fluctuations on the primary side to integrate a protective apparatus in the drive electronics 16, which protective apparatus detects overvoltage pulses occurring. On detection of overvoltage pulses, disconnection of the connected sensitive electronics can then take place early and the downstream components can be protected from destruction.

With the capacitive coupling according to the invention, therefore, voltage changes can be sensed very quickly. The lower limit frequency for the sensing of voltage changes is determined substantially by the time constant of the resistors 74 with the capacitors 72 and 73 connected in parallel, and the resistor 84 with the capacitors 82 and 84 connected in parallel.

Figure 3:
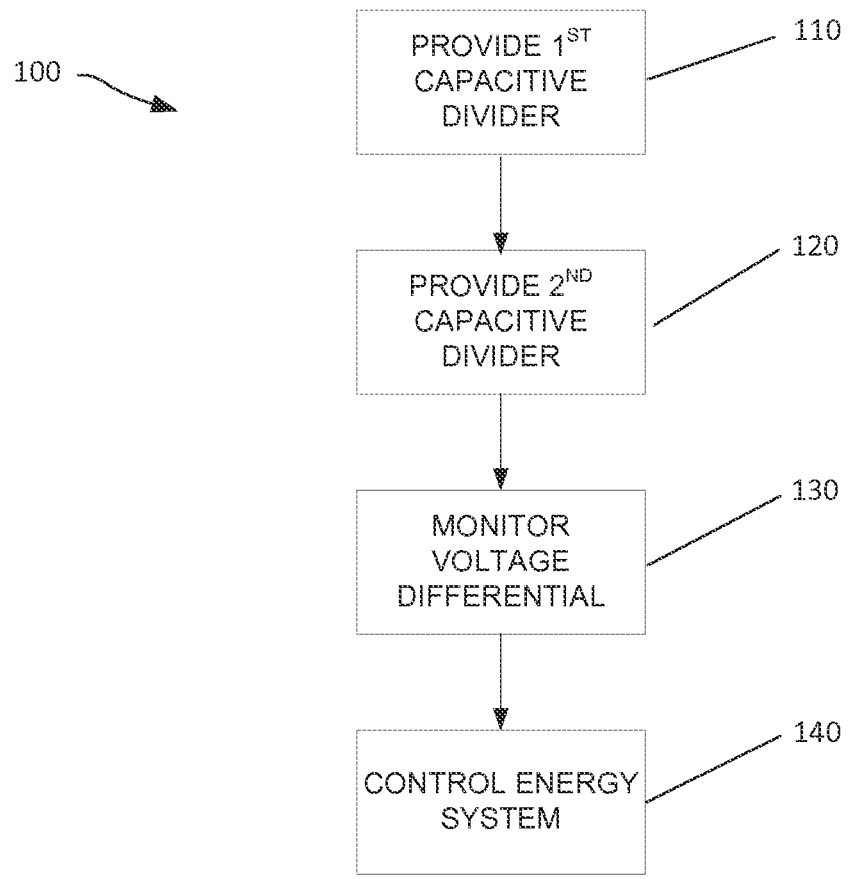
FIG. 3 shows a schematic illustration of a method for operating an energy system in accordance with an embodiment of the present invention.

FIG. 3 shows a schematic illustration of a method 100 for operating an energy system which is connected to a DC voltage, i.e., for example, a DC-to-DC converter. The method comprises the steps 100 of providing a first capacitive divider 7 which is arranged between a first terminal of the DC voltage and a reference potential. Furthermore, in a step 120, a second capacitive divider 8 is provided which is arranged between a second terminal of the DC voltage and the reference potential. In step 130, a voltage difference between a central terminal A of the first voltage divider 7 and a central terminal B of the second voltage divider 8 is monitored. Thereupon, in step 140, the energy system can be controlled depending on the monitored voltage difference.

By way of summary, the present invention relates to compensation of rapid voltage fluctuations in a DC-to-DC converter. For this, the primary side of the DC-to-DC converter is monitored by means of capacitive voltage dividers 7 and 8. A voltage fluctuation occurring can be detected early and then the DC-to-DC converter can be controlled correspondingly to counteract this.

The invention claimed is:

1. An apparatus for regulating an energy system which is connected to a DC voltage, comprising
    a first capacitive voltage divider (7), arranged between a first terminal of the DC voltage and a reference potential, the first capacitive divider (7) comprising a first capacitance (71) and a second capacitance (72, 73) connected in series, and a first terminal of the first capacitance (71) is connected to the first terminal of the DC voltage, a second terminal of the first capacitance (71) is connected to a first terminal of the second capacitance (72, 73) in order to form the central terminal (A) of the first voltage divider (7), and a second terminal of the second capacitance (72, 73) is connected to the reference potential;
    a first resistor (74), arranged in parallel with the second capacitance (72, 73);
    a second capacitive voltage divider (8), arranged between a second terminal of the DC voltage and the reference potential, the second capacitive divider (8) comprising a third capacitance (81) and a fourth capacitance (82, 83) connected in series, and a first terminal of the third capacitance (81) is connected to the second terminal of the DC voltage, a second terminal of the third capacitance (81) is connected to a first terminal of the fourth capacitance (82, 83) in order to form the central terminal (B) of the second voltage divider (8), and a second terminal of the fourth capacitance (82, 83) is connected to the reference potential;
    a second resistor (84) arranged in parallel with the fourth capacitance (82, 83);
    a voltage detector (25), configured to detect a voltage difference between a central terminal (A) of the first voltage divider (7) and a central terminal (B) of the second voltage divider (8); and
    a compensation apparatus (16), configured to control the energy system connected to the DC voltage based on the detected voltage difference.

2. The apparatus according to claim 1, wherein the second capacitance comprises at least two capacitors (72, 73), and the fourth capacitance comprises at least two capacitors (82, 83).

3. The apparatus according to claim 1, further comprising a first voltage limiter (75) configured to limit the voltages between the central terminal (A) of the first voltage divider (8) and the reference potential, and a second voltage limiter (85), configured to limit the voltages between the central terminal (B) of the second voltage divider (8) and the reference potential.

4. The apparatus according to claim 1, further comprising a filter apparatus (27), configured to suppress interference signals from the detected voltage difference.

5. The apparatus according to claim 4, wherein the filter apparatus (27) is a low-pass filter.

6. The apparatus according to claim 1, further comprising a protective apparatus (16), configured to deactivate the energy system when the voltage detector (25) detects a voltage difference which exceeds a predetermined threshold value.

7. The apparatus according to claim 1, wherein the energy system is a DC-to-DC converter.

8. The Apparatus according to claim 7, wherein the DC-to-DC converter is an isolated DC-to-DC converter.

9. A method for operating an energy system which is connected to a DC voltage, comprising the following steps
    providing (110) a first capacitive voltage divider (7), arranged between a first terminal of the DC voltage and a reference potential, the first capacitive divider (7) comprising a first capacitance (71) and a second capacitance (72, 73) connected in series, and a first terminal of the first capacitance (71) is connected to the first terminal of the DC voltage, a second terminal of the first capacitance (71) is connected to a first terminal of the second capacitance (72, 73) in order to form the central terminal (A) of the first voltage divider (7), and a second terminal of the second capacitance (72, 73) is connected to the reference potential;
    providing (120) a second capacitive voltage divider (8), arranged between a second terminal of the DC voltage and the reference potential, the second capacitive divider (8) comprising a third capacitance (81) and a fourth capacitance (82, 83) connected in series, and a first terminal of the third capacitance (81) is connected to the second terminal of the DC voltage, a second terminal of the third capacitance (81) is connected to a first terminal of the fourth capacitance (82, 83) in order to form the central terminal (B) of the second voltage divider (8), and a second terminal of the fourth capacitance (82, 83) is connected to the reference potential;
    providing a first resistor (74), arranged in parallel with the second capacitance (72, 73);
    providing a second resistor (84) arranged in parallel with the fourth capacitance (82, 83);
    monitoring (130) a voltage difference between a central terminal (A) of the first voltage divider (7) and a central terminal (B) of the second voltage divider (8); and
    controlling (140) the energy system based on the monitored voltage difference.

* * * * *